(12) United States Patent
Kanehiro et al.

(10) Patent No.: US 7,187,407 B2
(45) Date of Patent: Mar. 6, 2007

(54) CONTROL SYSTEM FOR IMAGE FILE

(75) Inventors: Makoto Kanehiro, Tokyo (JP); Koji Oka, Tokyo (JP); Shigekazu Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 745 days.

(21) Appl. No.: 10/393,990

(22) Filed: Mar. 24, 2003

(65) Prior Publication Data
US 2003/0234877 A1 Dec. 25, 2003

(30) Foreign Application Priority Data
Mar. 22, 2002 (JP) ............... 2002-080263
Mar. 19, 2003 (JP) ............... 2003-076423

(51) Int. Cl.
H04N 5/76 (2006.01)

(52) U.S. Cl. ............... 348/231.3; 348/207.1; 348/231.2; 348/231.6; 348/231.9

(58) Field of Classification Search ............ 348/231.2, 348/231.3, 207.1, 231.6, 231.9
See application file for complete search history.

(56) References Cited

U.S. PATENT DOCUMENTS

| | | | |
|---|---|---|---|
| 5,521,335 A | 5/1996 | Oka | |
| 5,745,688 A | 4/1998 | Oka | |
| 5,760,345 A | 6/1998 | Oka | |
| 5,835,081 A | 11/1998 | Oka | |
| 6,438,320 B1* | 8/2002 | Hatanaka | 386/117 |
| 6,445,460 B1* | 9/2002 | Pavley | 358/1.15 |
| 6,628,325 B1* | 9/2003 | Steinberg et al. | 348/211.1 |
| 6,765,612 B1* | 7/2004 | Anderson et al. | 348/231.2 |
| 6,886,056 B2* | 4/2005 | Ohmura | 710/62 |
| 2002/0191079 A1* | 12/2002 | Kobayashi et al. | 348/207.1 |

FOREIGN PATENT DOCUMENTS

| | | |
|---|---|---|
| JP | 11-234615 | 8/1999 |
| JP | 2001-69296 | 3/2001 |

OTHER PUBLICATIONS

U.S. Appl. No. 10/892,307, filed Jul. 16, 2004, Oka.
U.S. Appl. No. 11/060,480, filed Feb. 18, 2005, Mitekura et al.

* cited by examiner

*Primary Examiner*—Ngoc-Yen Vu
*Assistant Examiner*—Gary C. Vieaux
(74) *Attorney, Agent, or Firm*—Oblon, Spivak, McClelland, Maier & Neustadt, P.C.

(57) ABSTRACT

A control system for an image file eliminating saving of an overlapped image data part and saving files in a short time and in a power-saving manner. When a digital camera and a personal computer are connected with each other for data communication, the system compares record unit information to identify an image file that the digital camera has with record unit information to identify an image file that the personal computer has, and transfers to save the image file, which includes the record unit information that the digital camera has and the personal computer does not have, from the digital camera to the personal computer. After completing transfer of the image file from the digital camera to the personal computer, the personal computer generates record unit information newer than the record unit information of the acquired image file and transmits the newer record unit information to the digital camera, which can be recorded in the header of the image file newly photographed by the digital camera.

9 Claims, 16 Drawing Sheets

FIG. 6

| FAT | CLUSTER NUMBER | 000 | 001 | 002 | 003 | 004 | 005 | 006 | 007 |
|---|---|---|---|---|---|---|---|---|---|
| | USE STATUS | 001 | 002 | 003 | 004 | 006 | 000 | 007 | FFF |

| FAT | CLUSTER NUMBER | 008 | 009 | 010 | 011 | 012 | 013 | 014 | 015 |
|---|---|---|---|---|---|---|---|---|---|
| | USE STATUS | 000 | 000 | 011 | FFF | 000 | 000 | 000 | 000 |

| FAT | CLUSTER NUMBER | 016 | 017 | 018 | 019 | 020 | 021 | 022 | 023 |
|---|---|---|---|---|---|---|---|---|---|
| | USE STATUS | 017 | 019 | 000 | FFF | 000 | 000 | 000 | 000 |

CONTROL SYSTEM FOR IMAGE FILE

BACKGROUND OF THE INVENTION

1. Field of the Invention

The present invention relates to a control system for an image file, that stores image data photographed by an image-recording device such as a digital camera, for example, into a mass storage device such as a hard disc and a CD-R of an image-saving device such as a personal computer.

2. Description of Prior Art

An image-recording device such as a digital camera has a smaller image-saving area comparing to a device such as a personal computer installing the hard disc of mass storage. The same applied to the case where a mass storage medium is applied for the digital camera, and the recorded image data are often saved in the mass storage device such as the hard disc and CD-R of the personal computer in the end.

There exist two methods of saving the image data photographed by the digital camera in the hard disc, for example.

In one method, the recording medium such as a memory card is removed from an image reproduction device, the recording medium is then connected to a recording medium interface of the personal computer, and the photographed image data of the recording medium are directly saved in the hard disc of the personal computer. In another method, the digital camera and the personal computer perform data communication either by wire communication or wireless communication.

Concerning these points, Japanese Patent Laid-Open No. 11-234615 uses unique codes and Japanese patent Laid-Open No. 2001-69296 does not use transfer history information but uses record information.

Herein, a consideration is given to the case where the digital camera transmits the image data to the personal computer via data communication.

Generally, the image data saved in the memory card of the digital camera are kept in the memory card even after the data are transmitted to the personal computer. Therefore, if the camera photographs a new image after having saved the image data in the personal computer when the memory card has a non-stored area, new image data are saved in the non-stored area of the memory card. Thus, the image data already saved in the personal computer and the image data that are not yet saved coexist in the memory card.

As a result, there has existed a problem that the image data kept in the digital camera are transmitted in an overlapped manner when the image data newly photographed are transferred to the personal computer.

However, the image data already transmitted from the digital camera to the personal computer do not need to be transmitted again in most cases. Further, since the image data often have a large file size, more transfer time and electric power are consumed when wasteful data are transferred than the case of transmitting only a necessary file.

For this reason, there has existed drawback that a long time was required for saving the image data and the use efficiency of the recording medium that saves the image data reduced.

Furthermore, when the recording medium in which the image data have been recorded is removed from the digital camera and the camera photographs an image after attaching a new recording medium thereto, for example, the image data of the removed recording medium are not transferred as they are. Thus, when a plurality of detachable media such as a flash memory is used, overlapped image data could be transferred.

SUMMARY OF THE INVENTION

The present invention has been created focusing attention on the above-described problems, and it is therefore an object of the invention to provide an image file control system that eliminates saving of overlapped image data and is capable of saving data in short time.

To solve the above-described problems, according to a first aspect of the present invention, there is provided an image file control system for transmitting the image file from the image-recording device to the image-saving device, in the state where the image-recording device capable of photographing images, when saving photographed image data in an image-recording medium provided in itself, comprises a function to record predetermined record unit information identifying the image data and to save it as the image file in a header of the image data to be saved, an image-saving device, which is connected to the image-recording device to save the image file of the image-recording device, comprises a storage device for saving the image file, and the image-recording device and the image-saving device are connected so as to be capable of performing data communication, in which the image-saving device has a function to read out the record unit information of the header recorded in the image-recording medium, and to compare the record unit information in the image-recording device, which has been read out, with the record unit information of the header of the saved image file that the image-saving device has already saved, and acquire to save an image file having unacquired record unit information that the image-saving device does not have from the image-recording device to the recording device of the image-saving device.

The image file control system may be either an image file control program of the image-recording device or an image file control program of the image-saving device. Further, the image-recording device and the image-saving device may be connected with each other into one system.

The image-recording device is a device to photograph and record images, which has a concept to include an image recording and reproduction device having a function to reproduce the image. It includes the digital camera and a digital video camera, for example, or one capable of photographing images such as a cell phone. Furthermore, image-saving device is ones capable of saving the image data such as the personal computer, a portable computer such as a PDA.

In the first aspect of the present invention, when saving the image file, which the image-recording device has, in the image-saving device, whether overlapping of the record unit information recorded in the header of the image file exists or not is checked to prevent the image file already saved in the image-saving device from being saved in an overlapped manner, and the image file of the record unit information is transferred and saved when the record unit information is not overlapped. Accordingly, a saving processing of image completes in short time and battery consumption or the like reduces.

Herein, the record unit information is a code provided in the header of the image data to identify photographed image file, which is different for each image file. For example, a camera ID of digital camera, a medium ID of recording medium, a number showing photographed order of the photographed image file, and other unique codes are used.

According to a second aspect of the present invention, there is provided an image file control system, in which after completing transfer of the image file from the image-recording device to the image-saving device in the data communication, the image-saving device has a function to generate the record unit information newer than the record unit information of the acquired image file and to transmit the newer record unit information to the image-recording device to make it be a reference to be recorded in the header of the image file newly photographed by the image-recording device.

In the second aspect of the present invention, the image-saving device decides a new reference value of the record unit information for the header of the image file in the image-recording device when the image file is transferred from the image-recording device to the image-saving device, so that the image-saving device stores the record unit information in the header using the new record unit information as a reference, and thus overlapping of the record unit information is avoided.

Further, according to a third aspect of the present invention, there is provided an image file control system in which the record unit information is at least one of a device ID of the image-recording device, a record unit ID to identify the image file, a medium ID of the image-recording medium, a group ID that means a group of the image file, and a device ID of the image-saving device.

In the third aspect of the invention, it is possible to identify each image-recording device, each image-saving device, each recording medium, and each group of image files because each kind of ID is used for the record unit information, and thus overlapping of the record unit information can be checked in detail.

According to a fourth aspect of the present invention, there is provided an image file control system in which a fixed value set to the image-recording device in a fixed manner is used when a recording unit information that should be previously set to the image-recording device does not exist.

In the fourth aspect of the invention, the fixed value in the image-recording device is used as the record unit information even if the image-recording device does not have the record unit information, so that it is prevented that the record unit information cannot be checked.

According to a fifth aspect of the present invention, there is provided an image file control system in which, when a plurality of the image-saving devices exist, the record unit information to be set to the image-recording device is defined based on an order common to a plurality of the image-saving devices, and in the case where one of the image-saving devices acquires the image file from the image-recording device, when the record unit information acquired from the image-recording device is not the defined record unit information, the system comprises a function to acquire the image file related to the defined record unit information and the image file other than the defined record unit information.

According to the fifth aspect of the invention, even if a plurality of image-saving devices exists, any image-saving device defines the record unit information in the common order, and thus a unified control can be performed. Accordingly, it becomes clear that the image file is recorded in any image-saving device, and it is possible to save a new image file in any image-saving device.

According to a sixth aspect of the present invention, there is provided an image file control system that comprises a function to select validity of acquirement, in the case where the image-saving device acquires the image file having record unit information that the device has never set before.

According to the sixth aspect of the invention, when a plurality of image-saving devices try to save the image file that any image-saving device has never saved, the devices can select whether to save it or not, it is possible to prevent an unnecessary image file from being saved.

According to a seventh aspect of the present invention, in the case where a plurality of the image-saving devices are connected to a network, there is provided an image file control system provided with intensive control means that collects the defined record unit information that each image-saving device has set to the image-recording device and that controls the collected defined record unit information by a plurality of the image-saving devices, in which each of a plurality of the image-saving devices comprises a function to specify another image-saving device having the image file that each image-saving device itself does not have and to enable the specified another image-saving device to transfer the image file that each image-saving device itself does not have based on the defined record unit information collected by the intensive control unit and other-defined record unit information set by another image-saving device.

According to the seventh aspect of the invention, when a plurality of the image-saving devices exist on the network, it is possible to specify the image-saving device having the image file that each image-saving device itself has not saved, so that a necessary image file can be acquired and saved by accessing to the image-saving device that saves the file.

According to an eighth aspect of the present invention, there is provided an image file control system in which the image-recording device is made to transmit the record unit information of all the image files to the image-saving device by one operation, and the image-saving device has a function to acquire the image file from the image-recording device in the case where the acquired record unit information is either the defined record unit information that the image-saving device has defined for the image-recording device or the fixed value.

According to the eighth aspect of the invention, all record unit information is acquired by one operation, it is possible to acquire and save the image file related to the defined record unit information defined in the past or the fixed value from the information, and thus saving trouble of operation time.

According to a ninth aspect of the present invention, there is provided an image file control program that, when the image-recording device and the image-saving device are connected with each other so as to be capable of performing data communication, compares the record unit information to identify the image file that the image-recording device has with the record unit information to identify the image file that the image-saving device has, and transfers to save the image file, which includes the record unit information that the image-recording device has and the image-saving device does not have, from the image-recording device to the image-saving device.

According to a tenth aspect of the present invention there is provided an image file control program, in which after the image-recording device has transmitted and saved the image file in the image-saving device, the program has a function that the image-saving device gives the image-recording device the new record unit information to identify the image file that the image-recording device photographs after the data transmission, and the image-recording device controls the photographed image file based on the new record unit information that has been transmitted.

Since overlapped saving of the image file is checked by checking the record unit information in the ninth and tenth aspects of the invention, similar to the first and second aspects, the checking is performed in short time and the image file is prevented from being saved in an overlapped manner.

BRIEF DESCRIPTION OF THE DRAWINGS

FIG. 6 is an exemplary view of FAT.

DESCRIPTION OF THE PREFERRED EMBODIMENTS

Preferred embodiments of the present invention will be described with reference to FIGS. 1 to 7.

Figure 1:
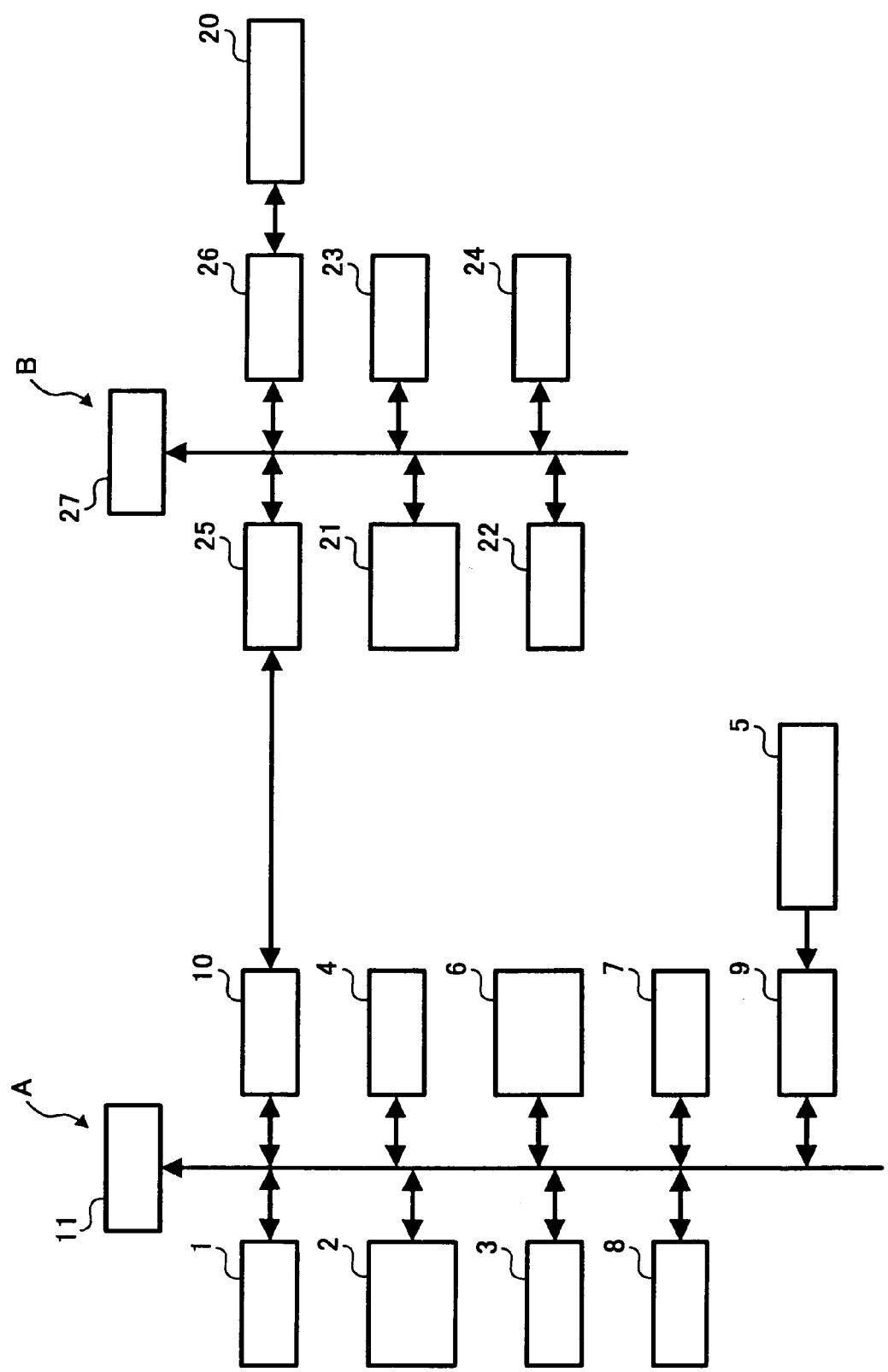
FIG. 1 is a configuration view of a first embodiment of the present invention.

In FIG. 1, reference code A and B denote a digital camera as an image-recording device and a personal computer as an image-saving device, respectively.

Reference numeral 1 of the digital camera A denotes an imaging section The imaging section 1 includes an optical lenses group, aperture mechanism, a CCD (or CMOS image sensor), and automatic focusing mechanism, and the optical lenses group is covered with a lens cover. The lens cover also serves as a power switch of the digital camera A. When the lens cover is withdrawn from the optical lenses group to make external light incident into the optical lenses group, the power switch of the digital camera A turns on to enable the digital camera A to photograph images.

The light made incident into the optical lenses group is detected by the CCD after passing though the aperture mechanism. Although the CMOS sensor may be used instead of the CCD as described above, the CCD is used in this embodiment.

The automatic focusing mechanism and the aperture mechanism begin a focusing operation and a metering operation when a shutter button is half-pushed down. A focal length and an aperture value of the optical lenses group are set based on the light detected by the CCD.

The automatic focusing mechanism includes a lens driving motor and an LED for distance measurement, in which the mechanism illuminates the LED for distance measurement and receives light reflected by a photographing subject to measure the distance to the subject, and changes the position of the optical lenses group. The operation from the illumination of LED for distance measurement to the positional movement of the optical lenses group is performed based on an automatic focusing program where a control section 8 (described later) automatically focuses on the subject. Further, in the aperture mechanism, the control section 8 computes a proper aperture value based on the light detected by the CCD, and sets the size of aperture of the aperture mechanism where light passes from the computed result.

Reference numeral 2 denotes an image memory storing the image data photographed by the imaging section 1. The image memory 2 stores the light detected by the CCD on a matrix and holds the image data. The image data on the image memory 2 change from time to time due to the light captured by the CCD, and the image data held in the image memory 2 are confirmed as a photographed image when a shutter button (described later) is pushed down.

Reference numeral 3 denotes a display section including a liquid crystal display panel. The liquid crystal display panel 3 displays the image captured by the CCD of the imaging section 1 by the control of the control section 8.

Reference numeral 4 denotes a compression section to compress the image data held in the image memory, where it compresses the image data confirmed in a JPEG format when the shutter button has been pushed down.

Reference numeral 5 denotes a memory card (recording medium) recording the image data compressed by the compression section 4. The memory card 5 consists of the flash memory, and stores the card ID as the medium ID. The memory card 5 is connected to a CPU 11 via an interface 9 (described later).

Reference numeral 6 denotes an ID memory built in the digital camera A. The ID memory 6 records the camera ID, the medium ID of the memory card 5, and a record ID to be added to the image file when photographing images. The memory area of the ID memory 6 consists of a ROM and a RAM of the CPU 11 (described later).

The record ID of the image file is an identification code to discriminate the image data acquired when an image was photographed from another image data. Generally, after a new memory card 5 is attached to the digital camera A and an image is photographed at the first time, a numerical value is added in addition to a predetermined alphanumeric character, for example. The record ID shall be a part of the record unit information in the present invention. The medium ID, the camera ID, and other unique codes are used other than the record ID as the record unit information.

Reference numeral 7 denotes an operation section made up of the shutter button and operation buttons such as operation mode provided for the body of the digital camera A.

Reference numeral 8 denotes a control section including a system program that sets photograph conditions of the digital camera A and processes photographing of images under operating instructions from the operation section 7. The control section 8 includes a control program that executes automatic focusing control, exposure control to decide exposure from a metering result of CCD, shutter speed control to decide a shutter speed of CCD, a function to execute compression/decompression of the image data held in the image memory, and saving of the image data and call/display of the saved image data.

In the digital camera A, the power switch turns on when the lens cover is opened, the CCD of the imaging section 1 is designed to capture the light having passed though a photograph optical system and output the light to the image memory 2.

Reference numeral 9 denotes an interface (I/O) with the memory card 5 being an external storage device of the digital camera A. Reference numeral 10 denotes an interface for information communication to transmit the image file to the personal computer B and receive a control signal from the personal computer B.

Reference numeral 11 denotes a CPU (central processing unit) to perform processing such as photographing and recording or communication of images, where it executes the control program of the control section 8. The CPU 11 includes the ROM for storing the control program and the camera ID, and the RAM for storing the photograph conditions that the operation section 7 has set with a photographing operation and the record unit information such as the record ID and the medium ID, which specify the photographed image data, The digital camera A includes the memory card 5 inside its body, where the camera confirms the image data held in the image memory 2 when the shutter button was pushed and records it in the memory card after the compression section 4 compresses it.

When the photographed image file is recorded in the memory card, information including the record ID regarding the compressed image data, the camera ID, and the photograph conditions is recorded in the header of the image data.

Figure 7:
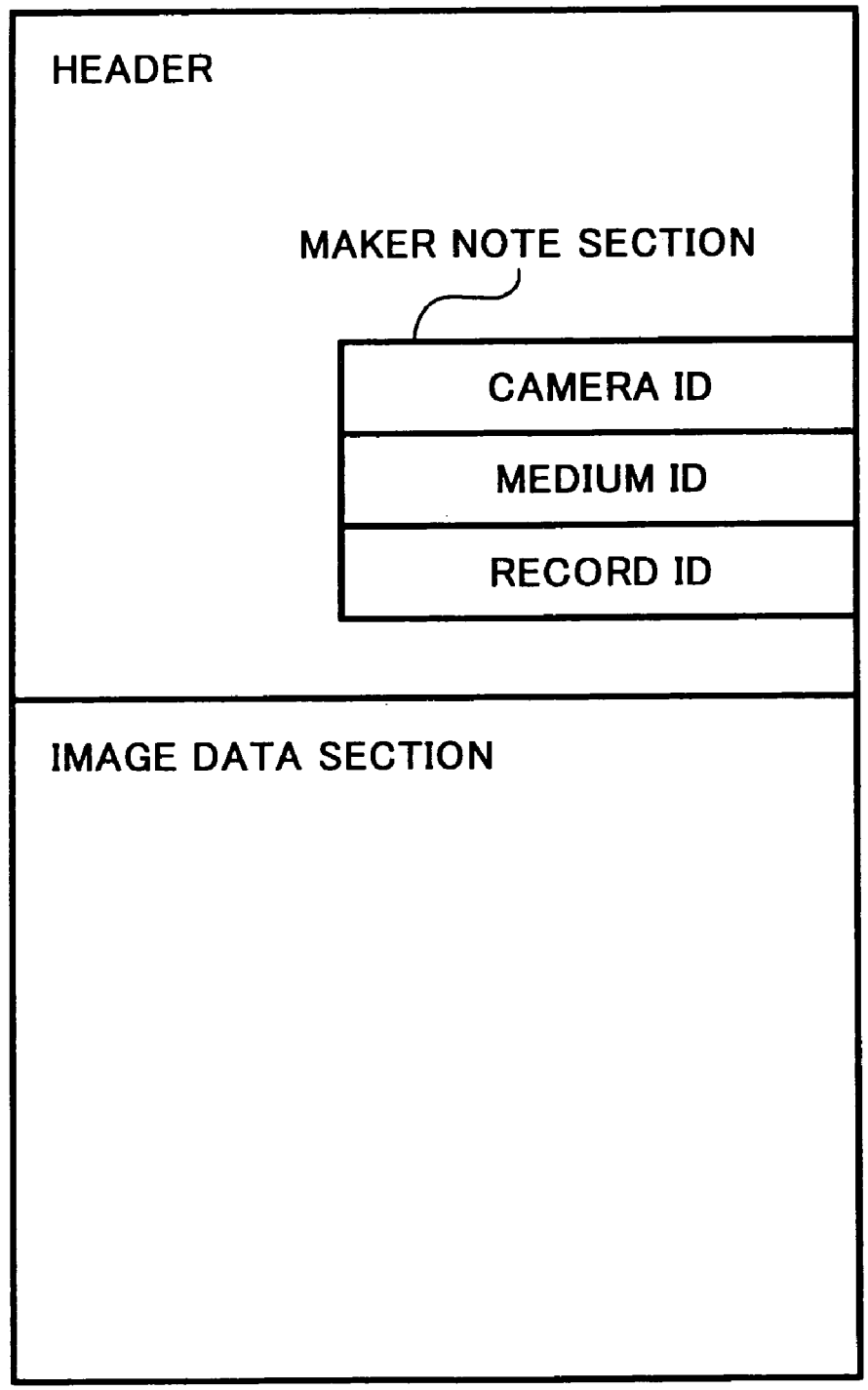
FIG. 7 is a configuration view of the image file in which the image data are recorded.

FIG. 7 shows the configuration of the image file that consists of the image data and the header. The header, as shown in FIG. 7, is provided with a maker note section, which a camera manufacturer has provided for the digital camera, and data regarding the camera ID such as a manufacturer name of the camera, a product name, and a product number are recorded in the maker note section. The camera ID is recorded as a fixed value in the ROM of the CPU 11. The medium ID and the record ID of the memory card 5 are also recorded in the maker note section. The medium ID and the record ID of image file are recorded in the memory card 5.

Further, in the personal computer B, reference numeral 27 denotes a CPU as hardware that performs processing. Although the CPU 27 itself has an internal memory, the computer includes a bulk DRAM on a main board.

Reference numeral 20 denotes an external storage device such as a HDD and CD-R to save the image data. Although the external storage device is the hard disc 20 in this embodiment, it may be the CD-R, a CD-RW, the flash memory, ZIP or the like instead of the hard disc 20.

Reference numeral 21 denotes an ID record section in the hard disc 20, where the camera ID, the medium ID and the record ID of all image files saved in the hard disc 20 are recorded in the ID record section 21.

Reference numerals 22 and 23 denote a display section made up of a CRT or an LCD and an operation section such as a keyboard, respectively. Reference numeral 24 denotes an image file control program for executing a software processing such as image saving. Reference numerals 25 and 26 denote an interface for information communication between the personal computer B and the digital camera A and an interface (I/O) between the personal computer B and the hard disc 20, respectively.

The image file control program 24 is stored in the hard disc 20 together with an OS (operating system) and a communication program. The image file control program 24 operates on the OS, and shall be capable of performing data communication with other personal computers by the communication program.

The ID record section 21 is a storage area recognized by the image file control program 24. The image file control program 24 is connected to the digital camera A via the OS and the interface 25 so as to be capable of performing data communication. Further, it is well known that the personal computer B and the other personal computers include interfaces (LAN, DSU, USB, serial port, parallel port, and the like, for example) for performing data communication with each other.

When a plurality of personal computers constitutes the network, the image file control programs 24 saved in the personal computers shall be capable of performing data communication to the image file that another personal computer has.

A server performing unified control of the image files is installed when a plurality of personal computers constitute the network. The personal computer that becomes the server computer is not only capable of mutually performing data communication with the digital camera A, but the personal computers controlled by the server computer are also designed to be able to transmit the image files saved in each computer and its record unit information to the server computer according to a request of the server computer.

When the image data recorded in the memory card 5 are saved in the hard disc 20, the interface 10 and the interface 25 are connected with each other via a data transmission path such as communication cable, connection wire, and wireless communication.

An MS-DOS format is generally used as a recording method when the image data are recorded in the memory card 5 and the hard disc 20.

Figure 4:
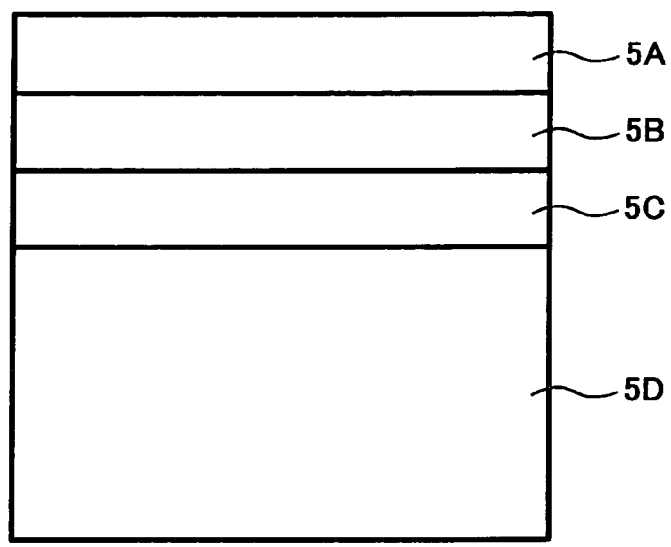
FIG. 4 is a configuration view of a memory card as one example of a flash memory and the recording medium.
Figure 5:
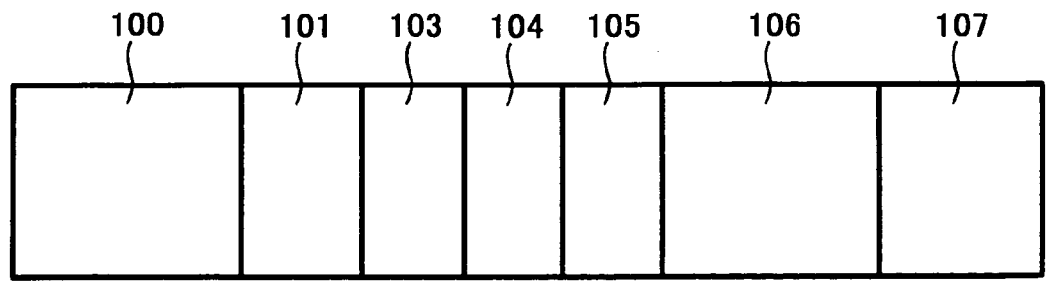
FIG. 5 is an exemplary view of a route directory.

In the MS-DOS format, all record areas of the memory card 5 and the hard disc 20 are divided into the areas shown in FIG. 4.

Specifically, a size of sectors that is the physically smallest record unit of the recording medium, the number of sectors per cluster, parameter such as FAT (File Allocation Table) necessary for DOS control are recorded in a sector area 5A.

A use status of the clusters is recorded in a FAT 5B.

In a route directory area 5C, as shown in FIG. 6, a file name 100, an identifier 101, an attribute 102, a reservation area 103, record time 104, record date 105, a starting cluster 106, a file size 107 and the like of each image file recorded in a data area 5D are recorded.

FIG. 7 shows a record example of the FAT 5B.

The address number of the FAT 5B corresponds to the cluster number of the data area 5D, and the use status of the cluster corresponding to the cluster number is recorded.

As shown in FIG. 7, '000' of the use status shows no record and 'FFF' shows the cluster in which final data are recorded, and the cluster number where record is subsequently performed is recorded for the ones other than '000' and 'FFF'.

Therefore, the table shows that the image file, which is the starting cluster number '000' of the route directory shown in FIG. 4, is recorded in the clusters '000' to '004', '006' and '007'.

Consequently, to read out the data recorded in the data area 5D, the file name recorded in the route directory area SC is searched first, the starting cluster number is read out, the recorded data are read out from the cluster in the data area 5D corresponding to the cluster number read out, and the clusters are sequentially read out until the record of FAT becomes 'FFF'.

Furthermore, when recording new file data, the FAT 5B is searched sequentially from the top address to find the cluster whose use status is '000', that is, no record, and the file data are recorded in the cluster found.

Therefore, the new file data are sequentially recorded in the clusters of the cluster numbers '005' '008', '009', '0012' and so on in the case of FIG. 7.

The image file including one piece of photographed image data consists of the header and the image data section as shown in FIG. 6.

The photographed image data are recorded in the image data section. The photograph conditions for the image data recorded in the image data section, compression parameter when compressing the image data, and the like are recorded in the header.

As described above, the header is provided with the maker note section where unique information is recorded, and in the present invention, the camera ID, the medium ID of the memory card 5, and the record ID of the photographed image data are recorded as the record unit information in the header.

The ID memory 6 of the digital camera A consists of the ROM and RAM of the above-described CPU. The camera ID such as the manufacturer name, the product name and the serial number is recorded in the ROM of CPU in order to specify the digital camera A in advance. The ID memory 6 that consists of the RAM is provided with an area where the medium ID capable of specifying the memory card 5 is recorded. When saving the image file in the memory card 5, the header is formed and the image file is saved while it is associated with the image data.

Next, description will be made for the operation where the digital camera A photographs images and makes the memory card 5 record them, referring to FIG. 2.

For example, when a user opens the lens cover to turn the power switch of the digital camera A on, an operation of photograph preparation begins. On the photograph preparation step of step SI, the control section 8 reads nut the medium ID recorded in the memory card 5, which is connected to the control section 8 via the interface 9, and records it in the ID memory 6.

On step S2, the CCD of the imaging section 1 receives the light made incident thereon through the photograph lenses group to capture the image of subject. The image data photographed by the CCD is recorded in the image memory 2 and displayed on the display section 3 on step S3.

Specifically, when the user opens the lens cover, the light having passed the photograph lenses group is captured by the CCD, temporarily held by the image memory and displayed on the display section 3. At this point, the image file to be recorded is not confirmed yet when the shutter button is not pushed down. Then, the photographing direction of the digital camera changes, or the image displayed on the display section changes with the changes of the subject.

On step S4, whether the shutter button has been pushed down or not is determined, and the processing proceeds to step S2 when determination is NO to repeat steps S2 to S4.

When the shutter button has been pushed down, the processing proceeds to step S5, and the image data saved in the image memory 2 are confirmed. The confirmed image data are compressed by the instruction of the compression section 4.

On step S6, the camera ID and the medium ID recorded in the ID memory 6 are called and the record ID of the latest image file out of the ones already saved is called, numerical value 1, for example, is added to the record ID to newly form the record ID, and it is recorded in the maker note section to form the header of the image data.

On step S7, the image data compressed by the compression section 4 is associated with the header formed on step S6 to form the image file, and it is recorded in the memory card 5.

When the recording to the memory card 5 ends, the processing proceeds to step S2 to repeat steps S2 to S7.

Next, description will be made for the operation of the first embodiment based on FIG. 3, where the image file control program 24 makes the digital camera A record the image data, which are recorded in the memory card 5, in the hard disc 20 of the personal computer B.

On step S20, the image file control program 24 of the personal computer B makes the digital camera A read out the camera ID, the medium ID and the record ID in the header of the image file, which are saved in the memory card 5, sequentially from the top image file to transfer to the computer.

On step S21, the image file control program 24 determines whether the camera ID, medium ID and record ID transferred on step S20 are recorded in the ID record section 21 or not.

In this determination, the processing proceeds to step S24 when the determination result is 'YES'. Specifically, the processing proceeds to step S24 when the camera ID, medium ID and record ID, which were transferred, have already been recorded in the ID record section 21.

The processing proceeds to step S22 when the determination on step S21 is 'NO'. The fact that the determination on step S21 is 'NO' means that the image file that matches the header of the image file, which is going to be transferred, has not been recorded in the personal computer B. On step S22, the camera ID, medium ID and record ID transferred on step S20 are recorded in the ID record section 21.

In other words, when the camera ID, medium ID and record ID, which were transferred from the memory card 5, have not been recorded yet in the ID record section 21 of the personal computer B on step S21, the camera ID, medium ID and record ID transferred on step S20 are recorded in the ID record section 21.

As described, since presence of the camera ID, medium ID and record ID saved in the personal computer B are determined, overlapping of the record IDs that could be the same number when the camera or the memory card 5 is changed can be avoided. In addition, determination can be processed in short time because overlapping of the header only is checked.

On step S23, the image file control program 24 of the personal computer B instructs the digital camera A to transfer the image file corresponding to the camera ID, medium ID and record ID recorded on step S22, and records the transferred image file in the hard disc 20.

On step S24, it is determined whether the camera ID, medium ID 6 and record ID have been transferred from the header of all image files recorded in the memory card 5 or not. The processing proceeds to step S20 when the determination is 'NO', and steps S20 to S24 are repeated.

The processing proceeds to step S25 when the determination on step S24 is 'YES', it is determined whether the image data recorded in the memory card 5 should be recorded in the hard disc 20 or not, and the processing ends when the determination is 'NO' (image data is not transferred).

The processing proceeds to step S26 when the determination on step S24 is 'YES', the image file is transferred from the memory card 5 to the hard disc 20, and then a new record ID is formed from the record ID (record ID recorded in ID record section 21 on step S22) transferred and saved in the hard disc 20.

As a forming method of the new record ID, the record ID is made to be a numerical value, for example, and a numerical value in which 1 is added to the numerical value of the record ID recorded on step S22 is made to be the new record ID.

On step S27, digital camera A is made to transfer the record ID formed on step S26, the record ID recorded in the ID memory 6 is updated to the transferred record ID, and the processing ends.

Note that, in this embodiment, the camera ID, medium ID and record ID are recorded in the maker note section of the header of the image file, which has been described in FIG. 6. However, the reservation area is provided for the route directory described in FIG. 5, which controls the image file, and the IDs may be recorded in the reservation area.

Further in this embodiment, the personal computer B is provided with the ID record section 21 and the camera ID, medium ID and record ID of all image files recorded in the hard disc 20 are recorded therein. However, when a transfer starting operation is entered, the header of the image files recorded in the hard disc 20 may be read out before step S20 and the record of the IDs may be formed.

Figure 8:
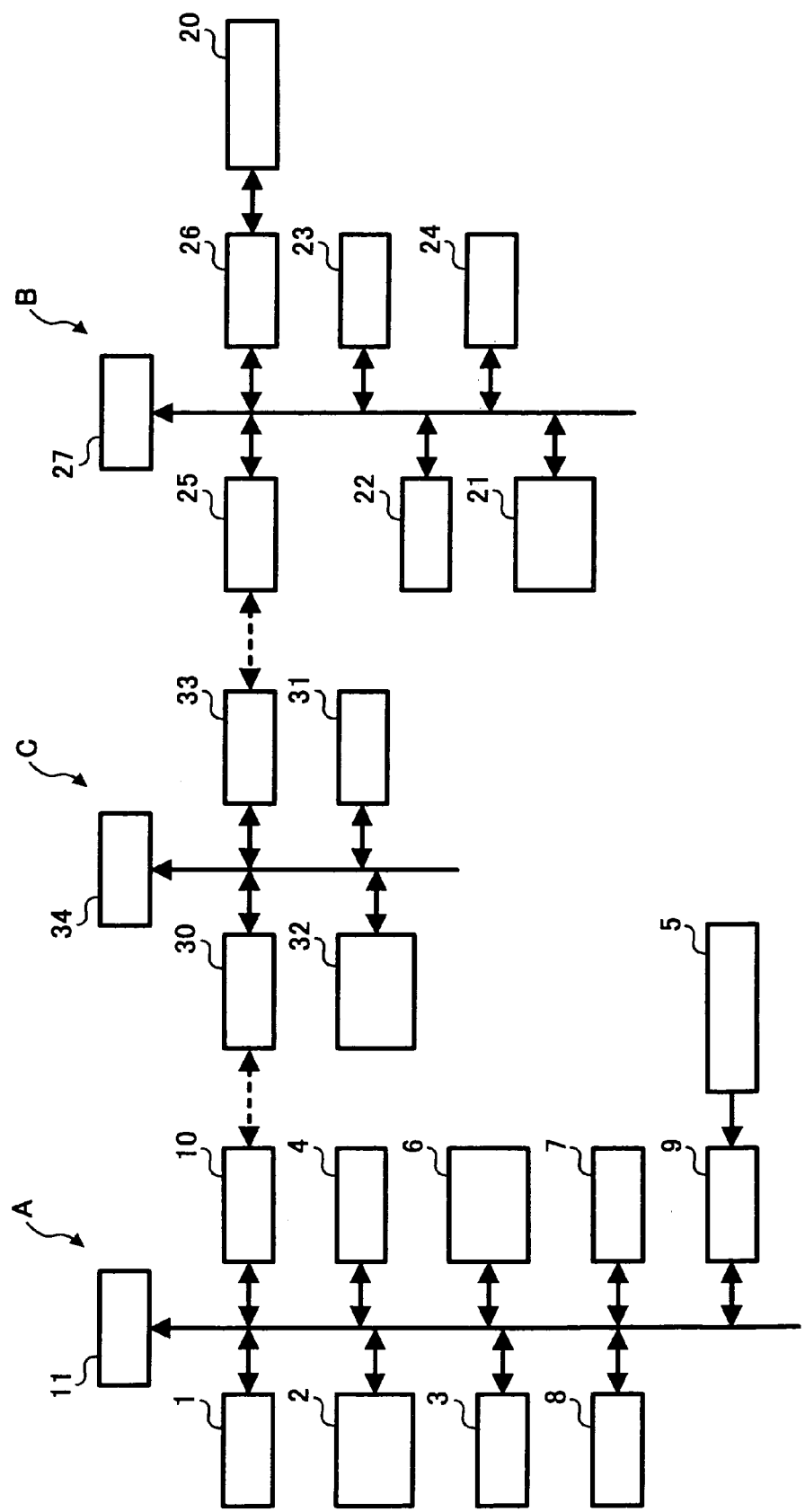
FIG. 8 is a configuration view of a second embodiment of the present invention.
Figure 9:
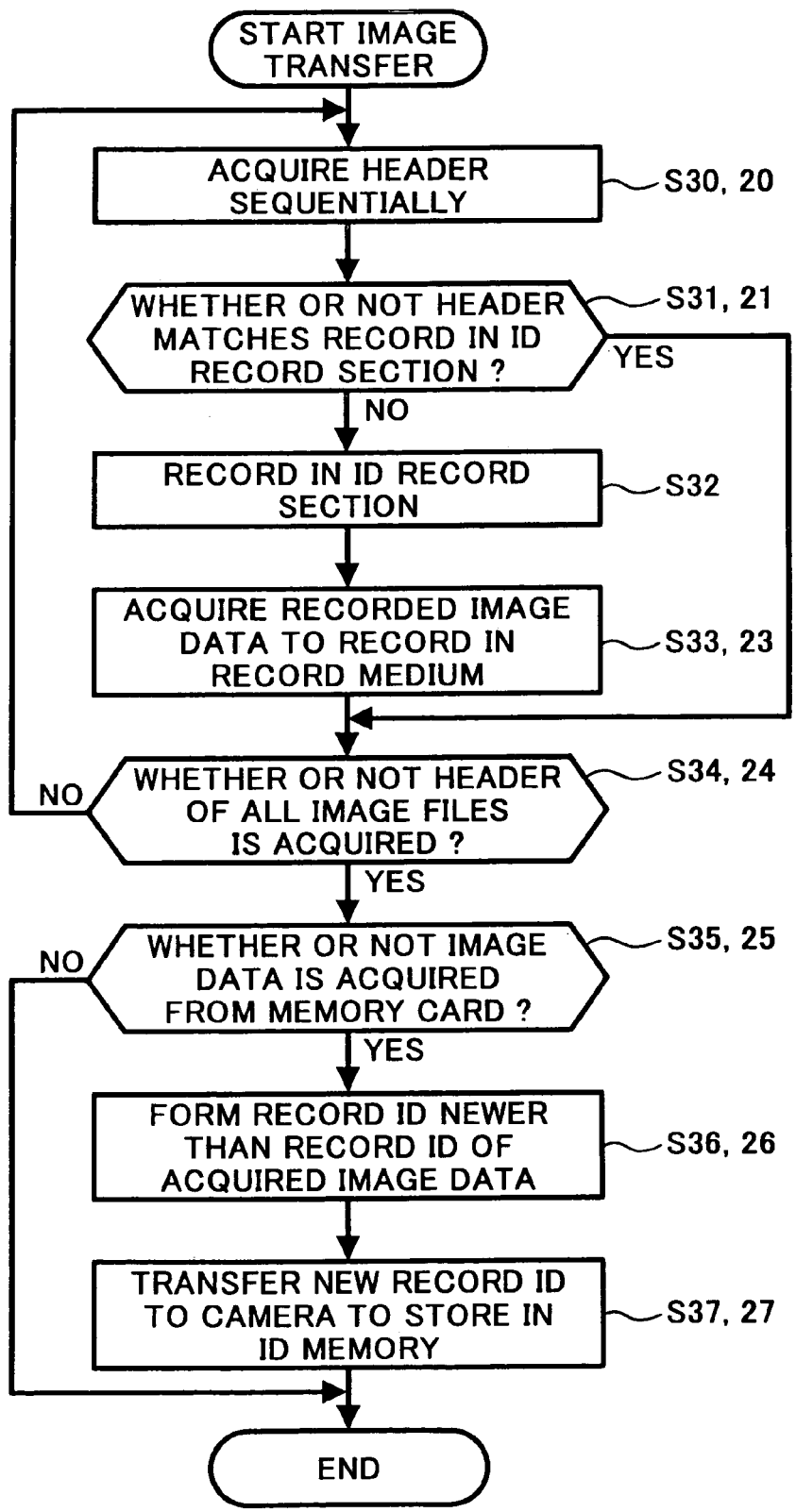
FIG. 9 is an operational flowchart of a server computer.

Next, the second embodiment of the present invention win be described referring to FIGS. 8 and 9. FIGS. 8 and 9 are the configuration view of the second embodiment and the operational flowchart of the second embodiment, respectively.

The second embodiment is applied for the case where the image files photographed by a plurality of digital cameras are recorded and saved in a plurality of recording media.

In FIG. 8, a server computer C (intensive control unit) as server device is connected to a plurality of digital cameras A and a plurality of personal computers B via a communication line or the like, and the image data photographed by the digital cameras A are recorded in the recording media of the personal computers B via the server computer C. Of course, there is a possibility that one of the digital camera A is connected with the network. The server computer C shall be intensive control means that collects the defined record unit information that each personal computer B set to the digital camera A and controls the defined record unit information, which has been collected, by a plurality of personal computers B.

Figure 2:
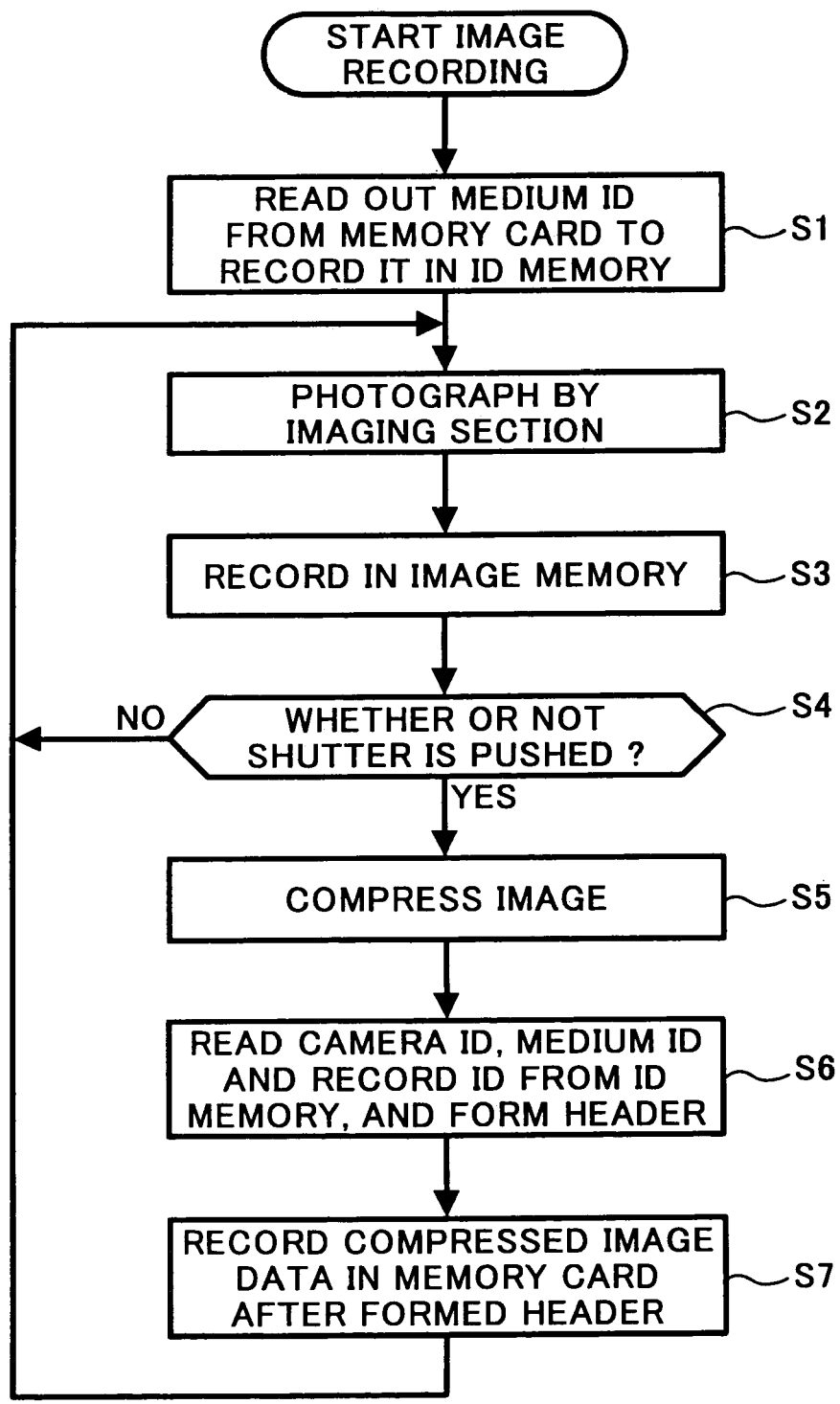
FIG. 2 is an operational flowchart when recording photographed image in the digital camera.

The configuration of the digital camera A is the same as the configuration of the first embodiment described in FIG. 1, and the operation when photographing images is the same as the operation described in FIG. 2.

The personal computer B operates to record the image data in the hard disc 20 (recording medium) when they are transferred from the server computer C.

Further, the server computer C essentially consists of an ID record section 30, a control section 31, interfaces (I/O) 32, 33, and a CPU 34 performing a processing.

A device ID is record in the ID record section 30 in addition to the camera ID, medium ID and record ID described in the first embodiment.

Next, the operation of the server computer C will be described referring to FIG. 9.

Figure 3:
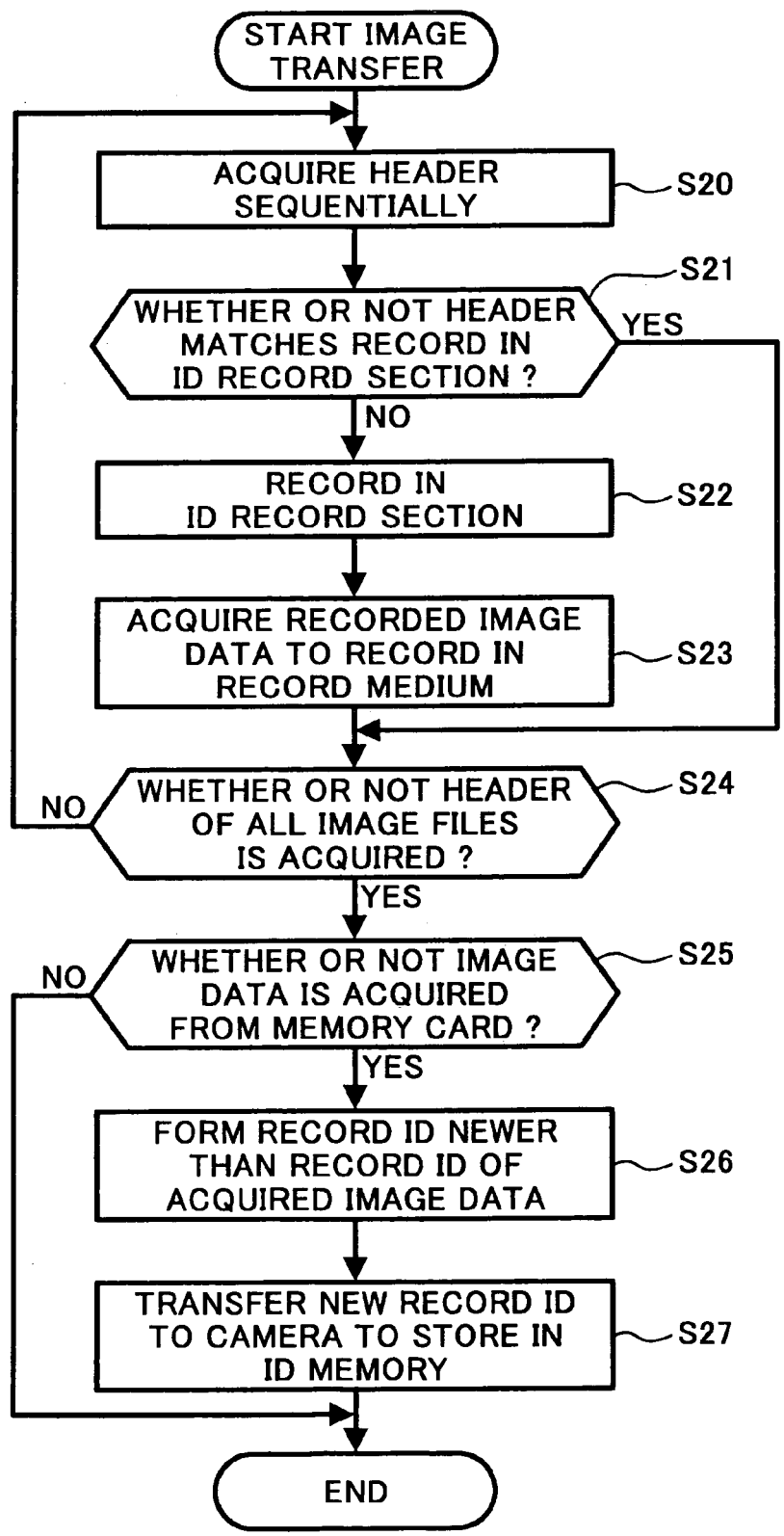
FIG. 3 is an operational flowchart when recording the image data in the recording medium of the first embodiment.

In the server computer C, steps S30, S31, and S33 to S37, which are the same processing as steps S20, S21, and S23 to S27, which have been described in FIG. 3, are executed except for step S32.

In starting the transfer of the image file, the server computer C sequentially acquires the header of the image file saved in the memory card 5 of the digital camera A from the digital camera A (step S30). Then, it compares the header with the record of the header of the image file recorded in the ID record section that the server computer C has (step S31). Herein, if the header of the image file of the digital camera A does not match the header that the server computer C has, it is recorded in the ID record section of the hard disc of the server computer C (step S32). Next, the server computer C acquires the header from the digital camera A to save it in the ID record section 30 of the hard disc (step S33). Note that the processing proceeds to step S34 when the header record of the server computer C and the header of the image file of the digital camera A match on step S31.

On step S32, in addition to the camera ID, medium ID and record ID, the device ID, which specifies the image-recording device (personal computer B) designated for recording the image data, are also recorded in the ID record section 30, and the image data is transferred to the specified image-recording device and recorded in its ID record section in step S33.

After the image file is saved on step S33, it is determined whether header check of the image file that the digital camera A has and the server computer C did not have has finished or not (step S34). When the header check for all image files has completed, the image file having the acquired header is transferred from the digital camera A to the server computer C, and the new record ID as the defined record unit information is formed for the header of the image file related to the acquired image data (step S36). The server computer C transmits the newly formed record ID to the memory card 5 of the digital camera A, and the digital camera A records the new defined record unit information, which has been sent, in the ID record section of the memory card, and uses it as the reference value for the next photographing.

As described, since the ID record section of the server records the device ID of the image-recording device in which the image data have been recorded as well, searching of the recorded image file can be easily performed.

Figure 10:
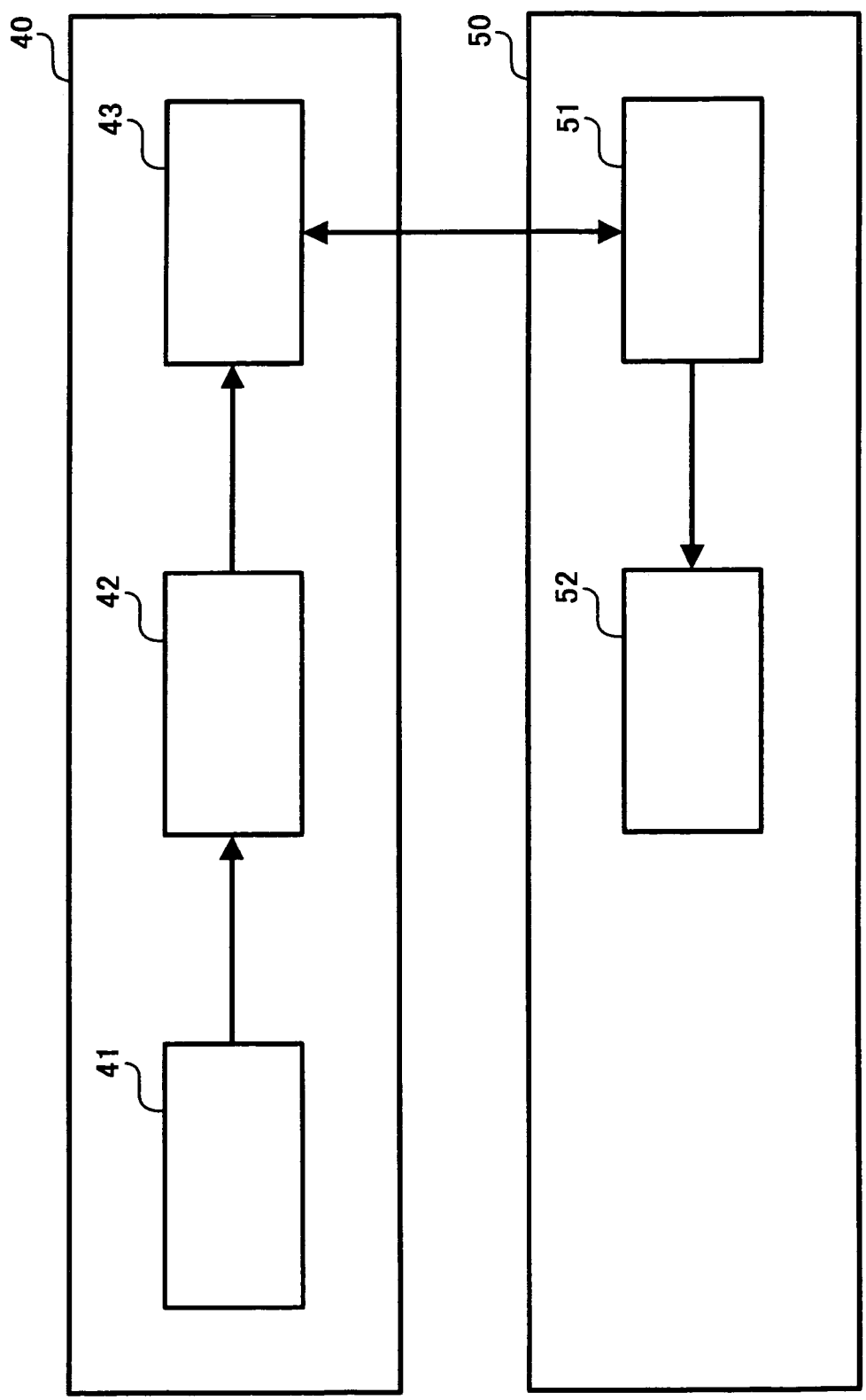
FIG. 10 is a view showing a configuration of the image file control system according to another embodiment of the present invention.

Next, another embodiment of the present invention will be described using FIGS. 10 to 15. FIG. 10 schematically shows the principal configuration regarding the image file control system. Reference numeral 40 denotes the digital camera as the image-recording device, and the digital camera 40 has an imaging section 41, an image processing section 42, and a memory card 43 as the image-saving section.

The imaging section 41 consists of a photograph lens optical system, and the image processing section 42 consists of the CCD or CMOS, the image memory and the CPU, a peripheral circuit, a control program for image photographing, a processing program to save photographed images, other programs, the internal memory, and the like. An image-saving section consists of the memory card 43 that is the recording medium. The digital camera 40 has a communication program and a communication circuit for performing data communication with a personal computer 50.

The personal computer 50 as the image-saving device is connected to the digital camera 40 to perform data communication via transmission path either by wire communication or wireless communication. The personal computer 50 has an image control application program 51 and a hard disc 52 as the image-saving section in addition to a well-known configuration. It is needless to say that the personal computer 50 has the OS and a communication device.

Figure 11:
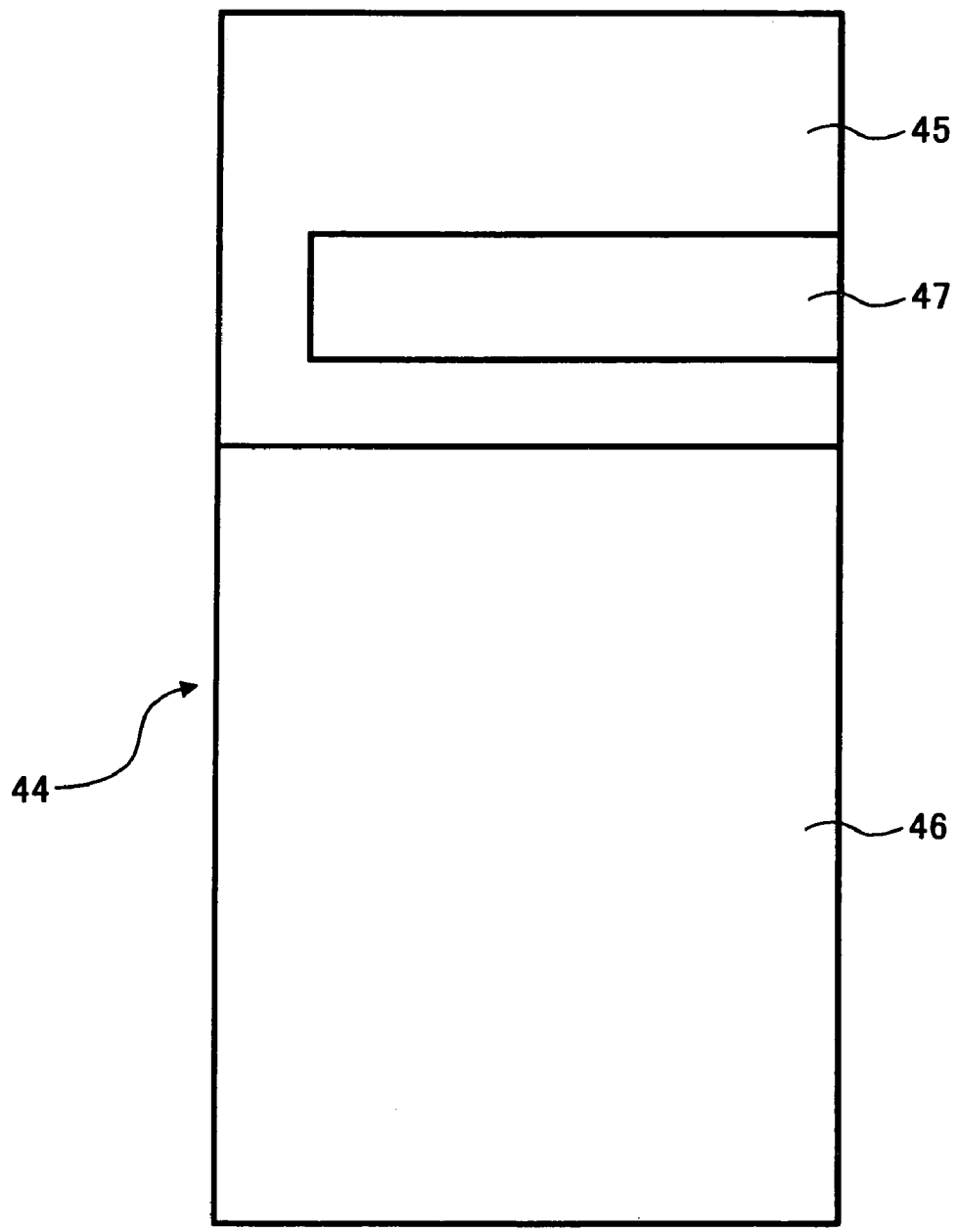
FIG. 11 is a configuration view of the image file having the image data and the header.

FIG. 11 shows the configuration of an image file 44 saved in the memory card 43 of the digital camera 40. The image file 44 consists of a header 45 and an image data part 46. Record unit information 47 is recorded in the header 45. The record unit information 47 consists of the camera ID, the medium ID, a group ID showing a saving location, the record ID for identifying each piece of photographed image data part 46, the photographed date, the photograph conditions and the like.

Figure 12:
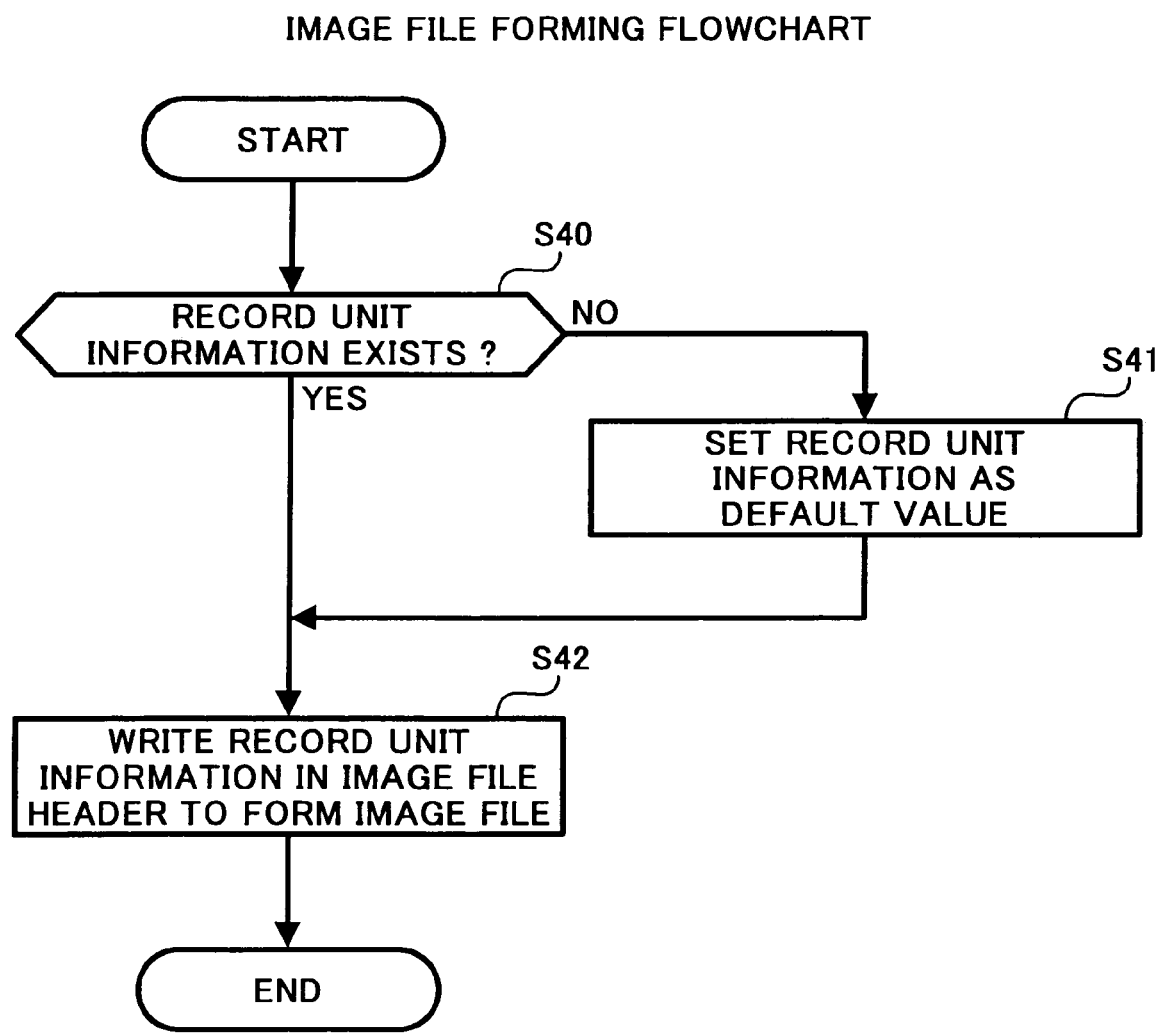
FIG. 12 is a flowchart showing a header forming processing of the image file according to FIG. 10.

FIG. 12 shows the processing where the digital camera 40 forms the header. The forming processing of the header by the digital camera 40 is an operation to identify the photographed image, in which record items such as a photographed order and the like of the photographed image file are formed. When the photographed image file has already been saved in the memory card 43, the header of the image file already saved is read out, which results in that the record unit information exists. Therefore, if the memory card 43 does not have the image file at all, it means that the record unit information does not exist. First, in starting the header forming, whether the memory card 43 has the record unit information or not is checked (step 40), the record unit information is set to a default value if the information does not exist (step 41), the record unit information is written in the header of the photographed image data to form the image file (step 42), and the header forming processing ends to save the image file in the memory card 43.

On step 40, when the image file has already been saved in the memory card 43, it is determined that the record unit information exists. Then, new record unit information is recorded in the header of the photographed image file to form the image file, and the header forming process ends. The formed image file is saved in the memory card 43.

Figure 13:
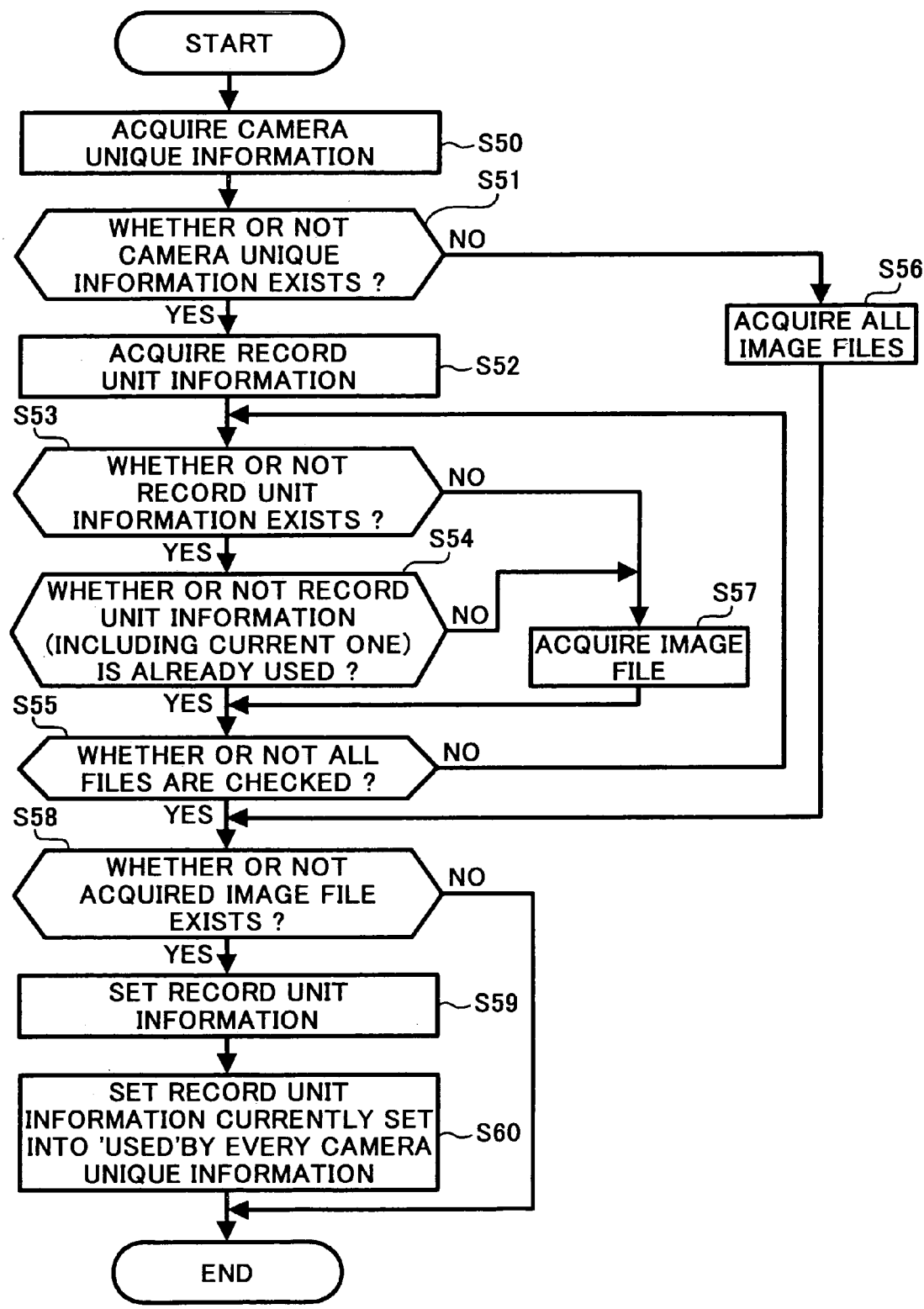
FIG. 13 is a flowchart showing a header check processing when saving the image file in the personal computer in the embodiment of FIG. 10.

FIG. 13 shows the processing flow when the image file is transferred from the digital camera 40 to the personal computer 50.

After the start of the transfer processing of the image file, the image file control program of the personal computer 50 checks with the camera ID that the digital camera 40 has (step 50) first, and determines presence of the camera ID (step 51). When the digital camera has the camera ID, the program checks with the record unit information of the header in the memory card 43 (step 52). If no camera ID exists, all image files are transferred (step 56).

The presence of record unit information is determined on step 52 (step 53), and when the record unit information exists, it is determined whether the record unit information of the photographed image file to be transferred has already been used as the record unit information of the personal computer 50 (step 54). In the determination on step 54, whether the record unit information has been used or not is checked including the record unit information of the image data that has just been photographed.

When the information has been used on the determination on step 54, whether all image files in the digital camera 40 have been checked or not is determined (step 55). If all image files have not been checked yet, the processing returns to a position before step 53. Further, if no record unit information exists in the determination on step 53, the image file related to the record unit information is transferred from the digital camera 40 to the personal computer 50. Furthermore, when the record unit information has not been used on step 54 as well, the image file related to the record unit information is transferred from the digital camera 40 to the personal computer 50.

After the header has been checked for all image files, it is determined on step 58 whether any image file was transferred from the digital camera 40 to the personal computer 50 in the period from step 50 to step 58. Then, if an image file was transferred, new record unit information is defined and formed (step 59), the record unit information of the header regarding the transferred image file is set as 'used' (step 60), the record unit information of the transferred image file is recorded and saved as 'used' in the ID record section of the hard disc of the personal computer 50, and the processing ends.

Figure 14:
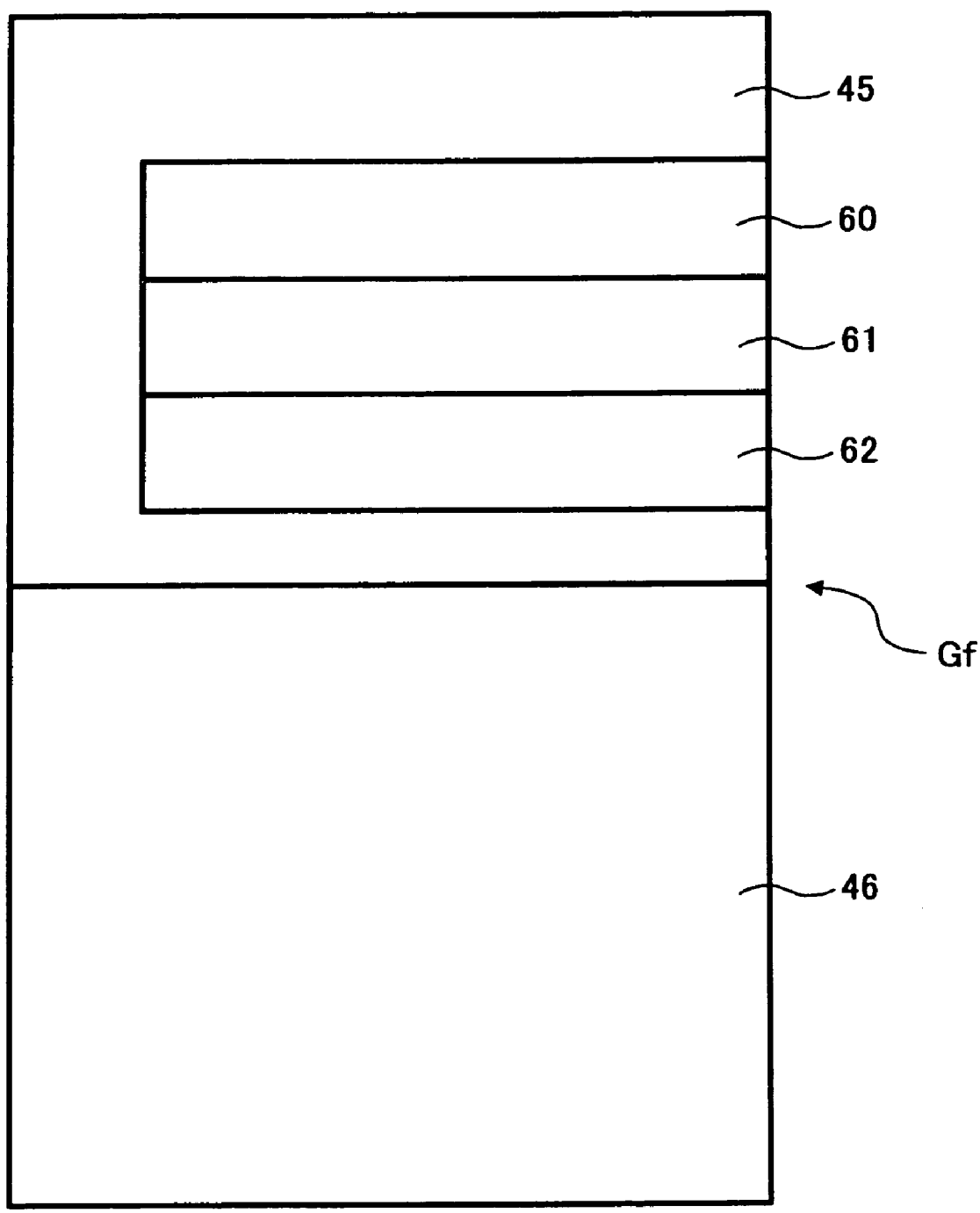
FIG. 14 is an image file configuration view in which the record unit information of the image header is provided with the medium ID, the camera ID and the record group ID, in the system of FIG. 10.

FIGS., 14 to 16 illustrate another embodiment of image file control. In FIG. 14, a medium ID 60 of the recording medium such as the memory card 43, a camera ID 61, and a record group ID 62 at the time of recording are provided as a part of the record unit information for the header of the image file 44. The record group ID shows a recording location such as a directory and a folder in the memory card 43.

Figure 15:
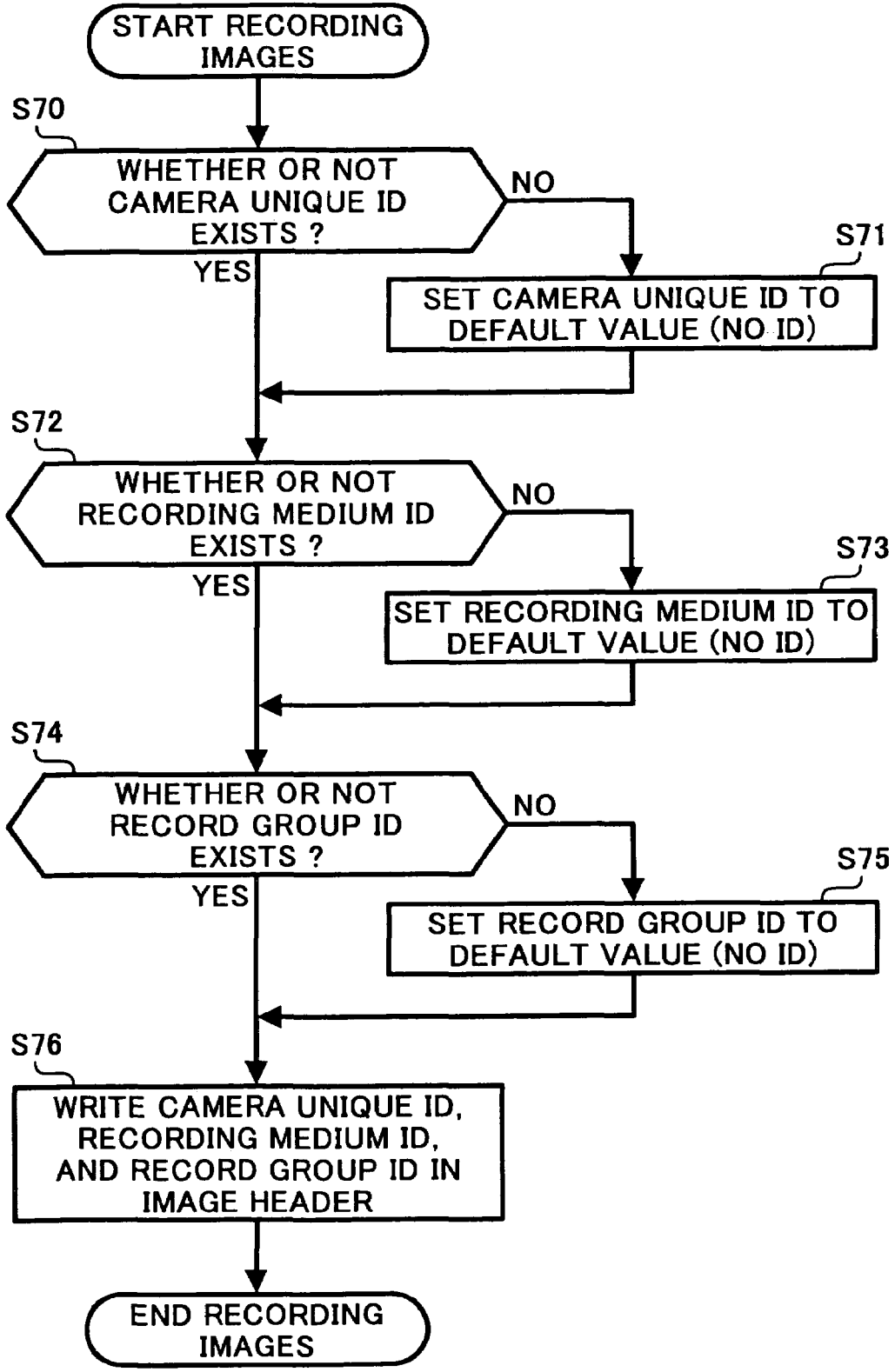
FIG. 15 is a flowchart showing a header processing in the digital camera when the image file has the header.

FIG. 15 shows the forming processing of the header in the digital camera 40. The forming processing of the header in the digital camera 40 of FIG. 15 is an operation to identify the photographed image, in which the record items such as the photographed order and the like of the photographed image file are formed.

On step 70, whether the header 45 has the camera ID 61 or not is determined, and the default value is set to the camera ID 61 when no record is in the camera ID 61 (step 71).

When the camera ID has been recorded, whether the medium ID 60 of the recording medium is recorded in the header 45 or not is determined (step 72). If the header 45 does not have a record of the medium ID 60 in this determination, the default value is set to the medium ID 60 (step 73), and the processing proceeds to step 74 when the medium ID 60 exists. On step 74, whether the header 45 has the record group ID 62 or not is checked, and the default value is set to the record group ID 62 if it does not exist (step 75).

In the processing of the header 45, the camera ID 61, medium ID 60, and group ID 62, which have been set to the header 45, are stored to end the formation of the header 45 (step 76), and the image file is saved in the memory card 43.

Figure 16A:
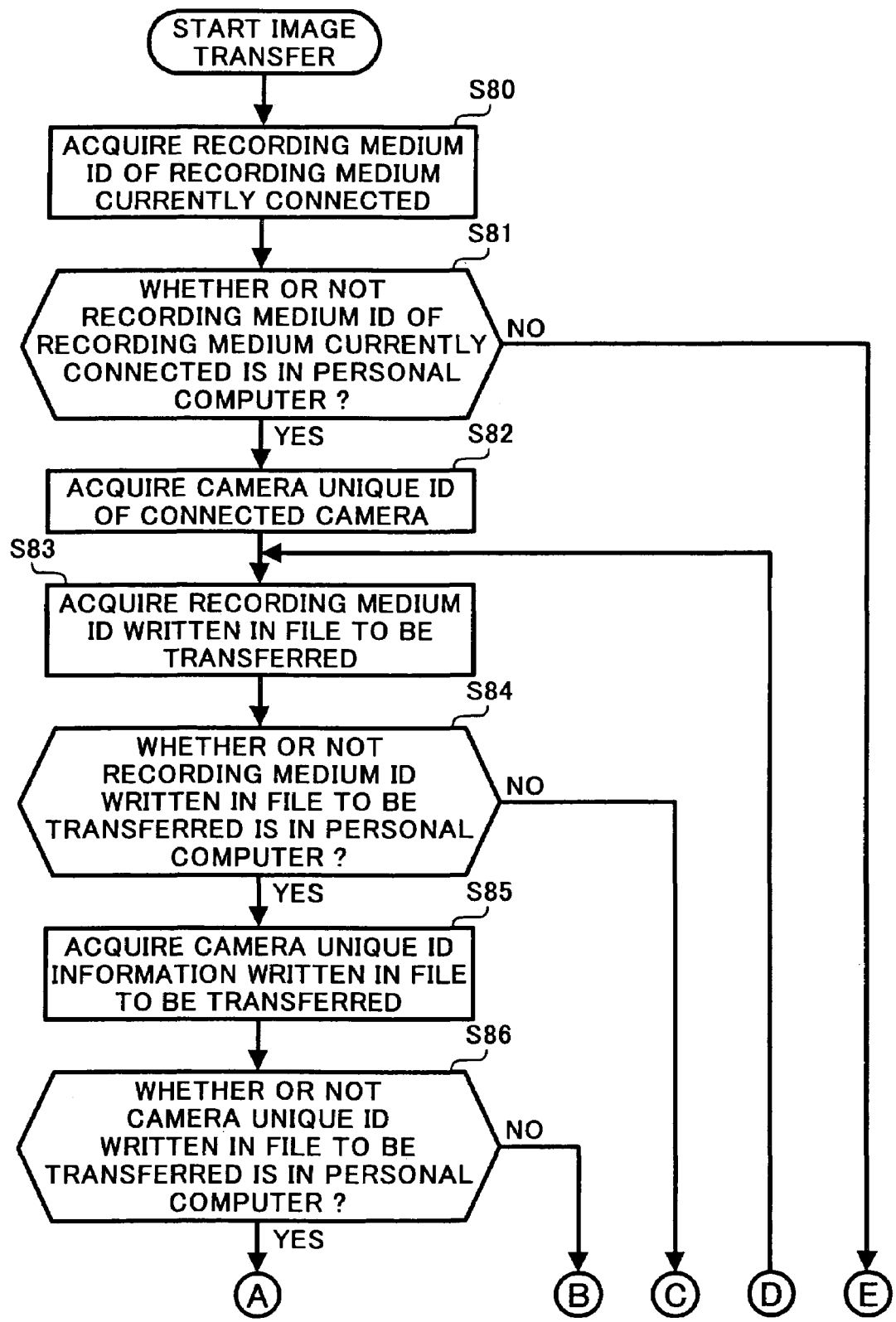
FIGS. 16 (A) and (B) are flowcharts showing a header processing and an image file transfer process of the image file having the header in the personal computer.
Figure 16B:
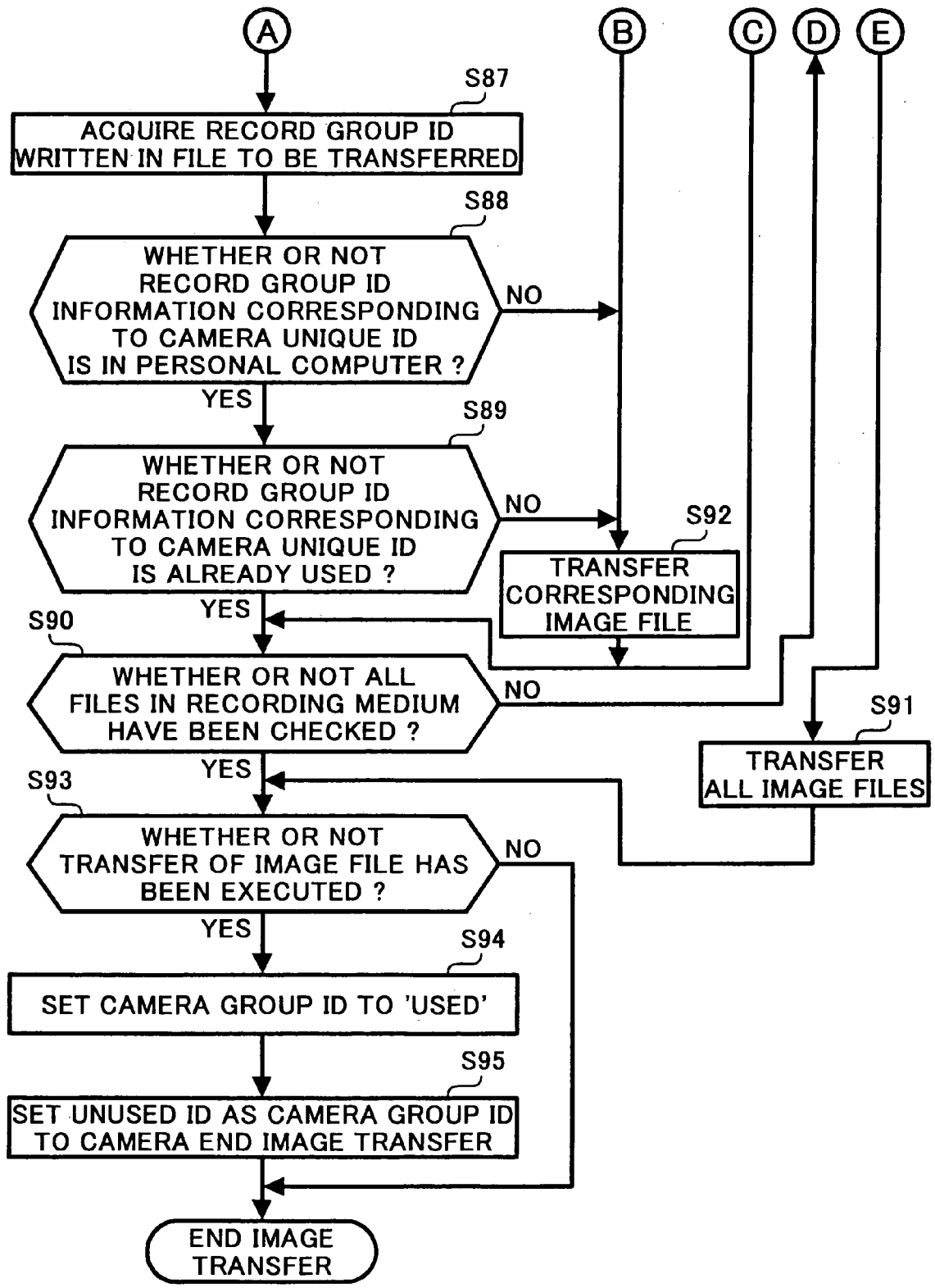

FIGS. 16 A and B show the transfer processing flow of the image file saved in the memory card 43 of the digital camera 40. An image file control program 51 of the personal computer 50 acquires the medium ID of the memory card 43 of the digital camera 40 currently connected thereto after the start of the image transfer processing (step 80), and determines whether the personal computer 50 has the information of the medium ID or not (step 81). The processing proceeds to step 91 (described later) if it does not have the medium ID on step 81, and acquires all image files in the memory card 43. When the computer already has the information of the medium ID on step 81, it checks with the camera ID of the connected digital camera 40 and acquires it (step 82).

After the camera ID of the digital camera 40 has been acquired, the medium ID 60 written in the header 45 of the image file to be transferred is acquired (step 83). In the next step 84, whether or not the personal computer 50 has the medium ID obtained in the step 83 is judged (step 84). This is for a reason that the camera ID, medium ID and recording group which are recorded in the header 45 of the image file are controlled by the personal computer 50. These three data are all determined when the image file is photographed and recorded in the header 45.

In the step 84, if it is judged that the personal computer 50 has the medium ID 60, the camera ID 61 written in the header 45 of the image file 44 to be transferred is acquired (step 85). If it is judged that the personal computer 50 has no medium ID in the step 84, the processing proceeds to step 90 which will be described hereinafter. On acquiring the camera ID 61, whether the camera ID 61 is stored in the personal computer 50 or not is determined (step 86). Herein, if the personal computer 50 has not stored the camera ID 61 yet, the processing proceeds to step 92 (described later), and the image file 44 corresponding to the camera ID is transferred. When the personal computer 50 has stored the camera ID 61, the record group ID 62 written in the header 45 of the image file 44 to be transferred is acquired (step 87). Whether the personal computer 50 has already stored the acquired record group ID 62 or not is checked as well (step 88), and the processing proceeds to step 92 and the image file 44 corresponding to the ID is transferred if the computer has not stored it. When the personal computer 50 has already stored the record group ID 62, the processing proceeds to the determination on step 89. On step 89, whether the record group ID 62 corresponding to the camera ID 61 has already been used in the ID record section of the hard disc in the personal computer 50 is checked. Herein, if the ID 62 has not been used yet, the processing proceeds to step 92 and the image file 44 corresponding to the ID is transferred. When the ID has already been used, whether all image files in the memory card 43 have been checked is determined (step 90). If all image files have not been checked yet, the processing returns to the position before step 83.

Note that all image files are transferred on step 91 and the image file 44 corresponding to the ID is transferred on step 92 as described above.

When all image files have been checked on step 90, the image file control program 24 checks whether the transfer of any image file has been executed in a series of the processing (step 93), and the processing ends when no image file was transferred. If an image file was executed on step 93, the record unit information of the transferred image file is processed as 'used' (step 94), new unused record unit information is transmitted to the digital camera to end the image transfer processing.

As described above, in the image file control program 24 according to this embodiment, the digital camera A capable of photographing images, when saving the photographed image data in the memory card 43 included in itself, comprises a function to record predetermined record unit information 47 for identifying the image data part 46 in the header 45 of the image data part 46 to be saved and to save it as an image file Gf.

The image file control program is the one to transmit the image file Gf from the digital camera A to the personal computer 50 in the state where the personal computer 50, which is connected to the digital camera A and saves the image file Gf of the digital camera A, comprises the hard disc 52 in which the control program for the image file is recorded. The control program for the image file (image file control program) has a function for transmitting the image file Gf from the digital camera A to the personal computer 50 in the state that the digital camera A and the personal computer 50 are connected with each other so as to be capable of performing data communication.

Then, the image file control program, when the personal computer 50 reads out the record unit information 47 in the header 45 recorded in the memory card 43, compares the record unit information 47 read out from the digital camera A by the personal computer 50 with the record unit information 47 in the header 45 of the image file Gf already saved in the personal computer 50. As a result of the comparison, if the image file Gf has un-obtained record unit information 47 that the personal computer 50 does not have, the program has a function for obtaining and saving the image file having the un-obtained record unit information 47 from the digital camera A into the recording device of the personal computer 50.

The image file control program may be the image file control program of the digital camera A, or may be the image file control program of the personal computer 50. Further, the digital camera A and the personal computer 50 may be connected into one system.

Instead of the digital camera A, the image recording and reproduction device having a function to reproduce images may be used. For example, the program can be applied for devices capable of photographing images such as the digital camera, digital video camera, and a cellular phone.

Moreover, the personal computer 50 may be a portable computer such as a PDA, or one capable of saving the image data part 46.

In the image file control program of the above-described embodiments, when the image file Gf that the digital camera A has is saved in the personal computer 50, whether the record unit information 47 recorded in the header 45 of the image file Gf is overlapped or not is checked in order to prevent the image file Gf already saved in the personal computer 50 from being saved in an overlapped manner, and when the record unit information 47 is not overlapped, then the image file Gf of the record unit information 47 is transferred and saved in the computer. Thus, the saving processing of images can be performed in short time, and battery consumption or the like lessens.

Herein, the record unit information 47 is a code provided for the header 45 of the image data part 46 to identify the photographed image file Gf, which is different for each image file Gf. For example, the camera ID of digital camera, the medium ID of storage device, a number showing photographed order of the photographed image file Gf, and other unique codes are used.

Furthermore, in the image file control program, after completing transfer of the image file Gf from the digital camera A to the personal computer 50 in the data communication, the personal computer 50 may have a function to generate the record unit information newer than the record unit information 47 of the acquired image file Gf and to transmit the newer record unit information 47 to the digital camera A to make it be a reference to be recorded in the header 45 of the image file Gf newly photographed by the digital camera A.

According to such embodiments, the personal computer 50 decides a new reference value of the record unit information 47 for the header 45 of the image file Gf in the digital camera A when the image file Gf is transferred from the digital camera A to the computer, so that the personal computer 50 stores the record unit information 47 in the header 45 using the new record unit information 47 as a reference, and thus overlapping of the record unit information 47 is avoided.

Further, the record unit information 47 may be one of the device ID of the digital camera A, the record unit ID to identify the image file Gf, the medium ID of the memory card 43, the group ID that means a group of image file Gf, and the device ID of the personal computer 50.

It is possible to identify each digital camera A, each personal computer 50, each recording medium, and each group of image file Gf because each kind of ID is used for the record unit information 47, and thus overlapping of the record unit information 47 can be checked in detail.

When a default value (fixed value) set to the digital camera A in a fixed manner is used if record unit information 47 that should be previously set does not exist in the digital camera A, the fixed value in the digital camera A is used as the record unit information 47 even if the digital camera A does not have the record unit information 47, so that it is prevented that the record unit information 47 cannot be checked.

Next, when a plurality of the personal computers 50 exist, the record unit information 47 to be set to the digital camera A is defined based on the order common to a plurality of the personal computers 50, and in the case where one of the personal computers 60 acquires the image file Gf from the digital camera A, when the record unit information 47 acquired from the digital camera A is not the defined record unit information 47, the image file control program has a function to acquire the image file Gf related to the defined record unit information 47 and the image file Gf other than the defined record unit information. Thus, even if a plurality of personal computers 50 exist, any personal computer 50 defines the record unit information 47 in the common order, the unified control can be performed, and it becomes clear that the image file Gf is recorded in any personal computer 50, and it is possible to save a new image file Gf in any personal computer 50.

Furthermore, m the case where the personal computer 50 acquires the image file Gf having the record unit information 47 that the computer has never set before, the system comprises a function to select validity of acquirement, so that when a plurality of the personal computers 50 try to save the image file Gf that any personal computer 50 has never saved, the computers can select whether to save it or not, and it is possible to prevent an unnecessary image file Gf from being saved.

Further, plurality of the personal computers 50 are connected to the network to constitute an image file control system, in the case where each personal computer 50 is adapted to be capable of collecting the defined record unit information 47 set in the digital camera A, there may be provided a server computer (intensive control means) that controls the defined record unit information 47 collected in the network every the plurality of personal computers 50, in which the image file control program of the personal computers 50 may comprise a function to specify another personal computer 50 having the image file Gf that each image-saving device itself does not have and to enable the specified another personal computer 50 to transfer the image file Gf that each personal computer itself does not have based on the defined record unit information 47 collected by the server computer and other-defined record unit information 47 set by another personal computer 50, which is an important aspect of the invention.

According to the present invention, when a plurality of the personal computers 50 exist on the network, it is possible to specify the personal computer 50 having the image file Gf that each personal computer itself has not saved, so that a necessary image file Gf can be acquired and saved by accessing to the personal computer 50 that saves the file.

Still further, the image file control program transmits the record unit information 47 of all the image files Gf from the digital camera A to the personal computer 50 by one operation, on the other hand, if the record unit information 47 which the personal computer 50 has received is either the defined record unit information 47 that the personal computer 50 has defined for the digital camera A or the fixed value, the personal computer 50 may comprise a function for obtaining the image files Gf from the digital camera A.

According to the present invention, all record unit information 47 is acquired by one operation, it is possible to acquire and save the image file Gf related to the defined record unit information 47 defined in the past or the fixed value from the information, and thus saving operation time.

Further, when the digital camera A and the personal computer 50 are connected with each other so as to be capable of performing data communication, the image file control program may compare the record unit information 47 to identify the image file Gf that the digital camera A has with the record unit information 47 to identify the image file Gf that the personal computer 50 has, and may transfer to save the image file Gf, which includes the record unit information 47 that the digital camera A has and the personal computer 50 does not have, from the digital camera A to the personal computer 50.

Moreover, the image file control program may be one, in which after the digital camera A has transmitted and saved the image file Gf in the personal computer 50, the personal computer 50 gives the digital camera A the new record unit information 47 to identify the image file Gf that the digital camera A photographs after the data transmission, and the digital camera A controls the photographed image file Gf based on the new record unit information 47 that has been transmitted.

With this configuration, the overlapped saving of the image file Gf is checked by checking the record unit information 47, the checking is performed in short time and the image file Gf is prevented from being saved in an overlapped manner.

What is claimed is:

1. A system for controlling an image file comprising:
    an image-recording device capable of photographing images; and
    an image-saving device connected with said image-recording device for saving an image file of said image-recording device,
    said image-recording device having, when saving photographed image data in an image-recording medium provided in itself, a function to record predetermined record unit information identifying said image data and to save the information as said image file in a header of the image data to be saved,
    said image-saving device having a storage device for saving said image file, and
    said system transmitting the image file from said image-recording device to said image-saving device in such a state that said image-recording device and said image-saving device are connected so as to be capable of performing data communication,
    wherein said image-saving device includes a function to read out said record unit information of said header recorded in said image-recording medium, and to compare the record unit information in the image-recording device, which has been read out, with the record unit information of the header of the saved image file that said image-saving device has already saved, and acquire to save an image file having unacquired said record unit information that said image-saving device does not have from said image-recording device to the recording device of said image-saving device, wherein after completing transfer of said image file from said image-recording device to said image-saving device in said data communication, said image-saving device includes a function to generate record unit information newer than said record unit information of the acquired image file and to transmit the newer record unit information to said image-recording device to make the newer record unit information as a reference to be recorded in a header of an image file newly photographed by said image-recording device.

2. A system for controlling an image file as claimed in claim 1, wherein
said record unit information is at least one of a device ID of said image-recording device, a record unit ID to identify said image file, a medium ID of said image-recording medium, a group ID that means a group of said image file, and a device ID of said image-saving device.

3. A system for controlling an image file as claimed in claim 1, wherein
a fixed value set to said image-recording device in a fixed manner is used when said record unit information that should be previously set to said image-recording device does not exist.

4. A system for controlling an image file as claimed in claim 1, wherein
when a plurality of said image-saving devices exist, the record unit information to be set to said image-recording device is defined based on an order common to a plurality of said image-saving devices, and in the case where one of said image-saving devices acquires the image file from said image-recording device, when the record unit information acquired from said image-recording device is not said defined record unit information, the image-saving device includes a function to acquire the image file related to said defined record unit information and the image file other than said defined record unit information.

5. A system for controlling an image file as claimed in claim 4 wherein
in the case where said image-saving device acquires the image file having record unit information that the device has never set before, the image-saving device comprises a function to select validity of acquirement.

6. A system for controlling an image file as claimed in claim 4, wherein
said image-recording device is made to transmit the record unit information of all of said image files to said image-saving device by one operation, and said image-saving device includes a function to acquire said image files from said image-recording device in the case where the acquired record unit information is either the defined record unit information that said image-saving device has defined for said image-recording device or a fixed value.

7. A system for controlling an image file as claimed in claim 1, wherein
in the case where a plurality of said image-saving devices are connected to a network, the system is provided with intensive control means that collects the defined record unit information that each image-saving device has set to the image-recording device and that controls the collected defined record unit information by a plurality of the image-saving devices, and each of a plurality of said image-saving devices comprises a function to specify another image-saving device having the image file that each image-saving device itself does not have and to enable the specified another image-saving device to transfer the image file that each image-saving device itself does not have based on said defined record unit information collected by said intensive control unit and other-defined record unit information set by another image-saving device.

8. A system for controlling an image file as claimed in claim 7, wherein
said image-recording device is made to transmit the record unit information of all of said image files to said image-saving device by one operation, and said image-saving device includes a function to acquire said image files from said image-recording device in the case where the acquired record unit information is either the defined record unit information that said image-saving device has defined for said image-recording device or a fixed value.

9. A computer implemented control process for an image file, wherein an image-recording device is configured to photograph images and an image-saving device is connected with said image-recording device, the computer implemented control process causing a computer to perform operations comprising:

when the image-recording device and the image-saving device are connected with each other and performing data communication, the control process comparing record unit information to identify an image file that said image-recording device has with record unit information to identify an image file that said image-saving device has, and transferring to save the image file, which includes the record unit information that said image-recording device has and said image-saving device does not have, from said image-recording device to said image-saving device, after said image-recording device has transmitted and saved the image file in said image-saving device, the control process giving said image-recording device new record unit information to identify the image file that said image-recording device photographs after said data transmission, and said image-recording device controlling the photographed image file based on the new record unit information that has been transmitted.

* * * * *